United States Patent
Saeki et al.

(10) Patent No.: US 10,280,901 B2
(45) Date of Patent: May 7, 2019

(54) WIND POWER GENERATION SYSTEM

(71) Applicant: Hitachi, Ltd., Chiyoda-ku, Tokyo (JP)

(72) Inventors: Mitsuru Saeki, Tokyo (JP); Takashi Shiraishi, Tokyo (JP); Junichi Sugino, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 43 days.

(21) Appl. No.: 14/971,035

(22) Filed: Dec. 16, 2015

(65) Prior Publication Data

US 2016/0177927 A1 Jun. 23, 2016

(30) Foreign Application Priority Data

Dec. 17, 2014 (JP) .................................. 2014-254746

(51) Int. Cl.
*F03D 11/04* (2006.01)
*F03D 9/00* (2016.01)
(Continued)

(52) U.S. Cl.
CPC .............. *F03D 13/25* (2016.05); *B63B 21/50* (2013.01); *F03D 9/25* (2016.05); *F03D 13/22* (2016.05);
(Continued)

(58) Field of Classification Search
None
See application file for complete search history.

(56) References Cited

U.S. PATENT DOCUMENTS 4,603,551 A * 8/1986 Wood ..................... B01D 61/10
417/333
8,057,127 B2 * 11/2011 Lopez .................... B63B 39/03
114/264

(Continued)

FOREIGN PATENT DOCUMENTS

DE 198 46 796 A1 4/2000
GB 2459172 A 10/2009

(Continued)

OTHER PUBLICATIONS

Extended European Search Report issued in counterpart European Application No. 15200821.5 dated May 11, 2016 (seven (7) pages).

(Continued)

*Primary Examiner* — Tulsidas C Patel
*Assistant Examiner* — Joseph Ortega
(74) *Attorney, Agent, or Firm* — Crowell & Moring LLP

(57) ABSTRACT

A wind power generation system comprising: a wind power generation equipment having a rotor which is operative to convert energy of received wind to rotational energy, a rotatable nacelle which supports the rotor, a tower which supports the rotatable nacelle, a floating body which supports the tower and at least a part of the floating body is positioned above the surface of the sea, a fixing member which is installed or fixed on the sea bed, a mooring member which couples the floating body and the fixing member, wherein the mooring member is coupled to the floating body at place upward of the center of gravity of the floating body and the wind power generation equipment, and the floating body is practically supported by one fixing member.

10 Claims, 13 Drawing Sheets

(51) Int. Cl.
  F03D 13/25 (2016.01)
  B63B 21/50 (2006.01)
  F03D 9/25 (2016.01)
  F03D 13/20 (2016.01)
  B63B 35/44 (2006.01)

(52) U.S. Cl.
  CPC ... *B63B 2021/505* (2013.01); *B63B 2035/442* (2013.01); *B63B 2035/446* (2013.01); *F05B 2240/2213* (2013.01); *F05B 2240/93* (2013.01); *F05B 2240/95* (2013.01); *Y02E 10/721* (2013.01); *Y02E 10/726* (2013.01); *Y02E 10/727* (2013.01)

(56) References Cited

U.S. PATENT DOCUMENTS

| | | | | |
|---|---|---|---|---|
| 8,729,723 | B2* | 5/2014 | Boureau | F03D 1/001 290/55 |
| 2003/0168864 | A1* | 9/2003 | Heronemus | B63B 1/047 290/55 |
| 2005/0229836 | A1* | 10/2005 | Borgen | E02D 27/42 114/264 |
| 2006/0269396 | A1* | 11/2006 | Borgen | F03D 13/25 415/84 |
| 2009/0051168 | A1* | 2/2009 | Fujisato | F03B 13/1815 290/53 |
| 2009/0091136 | A1* | 4/2009 | Viterna | B63B 21/50 290/55 |
| 2010/0244451 | A1* | 9/2010 | Ahdoot | F03B 13/186 290/53 |
| 2011/0042949 | A1* | 2/2011 | Laz | F03B 13/20 290/42 |
| 2012/0074702 | A1* | 3/2012 | Ahdoot | F03B 13/182 290/53 |
| 2012/0098265 | A1* | 4/2012 | Skaare | F03D 7/0272 290/53 |
| 2012/0286519 | A1* | 11/2012 | Yoon | F03D 7/0204 290/55 |
| 2013/0118176 | A1* | 5/2013 | Scharmann | F03B 13/18 60/716 |
| 2013/0152839 | A1* | 6/2013 | Graf | B63B 21/50 114/125 |
| 2013/0272846 | A1 | 10/2013 | Inoue | |
| 2014/0017083 | A1* | 1/2014 | Pineda Amo | F03D 7/06 416/37 |
| 2014/0026798 | A1 | 1/2014 | Yoshimoto et al. | |
| 2014/0147248 | A1* | 5/2014 | Akimoto | F03D 9/008 415/3.1 |
| 2014/0175795 | A1 | 6/2014 | Ide et al. | |
| 2014/0193259 | A1 | 7/2014 | Borgen | |
| 2015/0275850 | A1* | 10/2015 | Numajiri | E02D 27/425 290/55 |
| 2015/0354532 | A1* | 12/2015 | Nielsen | F03D 7/0224 416/9 |
| 2016/0025074 | A1 | 1/2016 | Sato et al. | |
| 2016/0265506 | A1* | 9/2016 | Kimura | F03B 13/1845 |

FOREIGN PATENT DOCUMENTS

| | | | | |
|---|---|---|---|---|
| JP | 2002-188557 | A | | 7/2002 |
| JP | 2002188557 | A * | 7/2002 | ............ B63B 21/50 |
| JP | 2005-526213 | A | | 9/2005 |
| JP | 2008-95702 | A | | 4/2008 |
| JP | 2014-504697 | A | | 2/2014 |
| JP | 2014-173586 | A | | 9/2014 |
| WO | WO 00/58621 | A1 | | 10/2000 |
| WO | WO 03/004869 | A1 | | 1/2003 |
| WO | WO-03004869 | A1 * | 1/2003 | ............ B63B 35/44 |
| WO | WO 03/098038 | A1 | | 11/2003 |
| WO | WO-03076800 | A3 * | 11/2003 | ............ B63B 35/44 |
| WO | WO-2004097217 | A1 * | 11/2004 | ............ F03D 13/25 |
| WO | WO-2005021961 | A1 * | 3/2005 | ............ B63B 21/502 |
| WO | WO 2006/132539 | A1 | | 12/2006 |
| WO | WO 2012/060108 | A1 | | 5/2012 |
| WO | WO 2012/121247 | A1 | | 9/2012 |
| WO | WO 2014/083684 | A1 | | 6/2014 |

OTHER PUBLICATIONS

Japanese-language Office Action issued in counterpart Japanese Application No. 2014-254746 dated Oct. 31, 2017 with English translation (Seven (7) pages).
European Examination Report issued in counterpart European Application No. 15200821.5 dated Nov. 3, 2017 (Four (4) pages).
Canadian Office Action issued in counterpart Canadian Application No. 2,915,239 dated Jan. 19, 2018 (four pages).
Japanese-language Office Action issued in counterpart Japanese Application No. 2014-254746 dated Jun. 5, 2018 with English translation (five (5) pages).

* cited by examiner

WIND POWER GENERATION SYSTEM

CLAIM OF PRIORITY

The present application claims priority from Japanese Patent application serial no. 2014-254746, filed on Dec. 17, 2014, the content of which is hereby incorporated by reference into this application.

TECHNICAL FIELD

The present invention relates to a wind power generation system and more particularly, to a floating wind power generation system installed offshore.

BACKGROUND ART

Offshore wind power generation systems have become more important from a viewpoint of worldwide demand for and economic performance of renewable energy. Above all, it has become more important to achieve the practical use of floating offshore wind power generation systems constructible even in deep sea areas.

As shown in FIG. 11, a conventional floating offshore wind power generation system is anchored to the seabed with three or more mooring members in order to suppress pitch vibrations (windwise vibrations), roll vibrations (across-wind vibrations) and yaw vibrations (rotational vibrations) of a floating body.

However, an offshore construction work for setting up the three or more mooring members substantially with an equal tension lowers the economic performance of the floating offshore wind power generation system. This triggers a strong demand for a floating offshore wind power generation system that is anchored in place with a single mooring member.

As to the floating offshore wind power generation system, a technique such as set forth in Japanese Unexamined Patent Application Publication No. 2005-526213 is known, for example. Japanese Unexamined Patent Application Publication No. 2005-526213 discloses "a wind-driven electric power plant which is built afloat at a deep sea area and includes: a machine room including an electric generator; an adjustment device; a rotor shaft and a rotor blade. The power plant has a structure where the above-described machine room is mounted atop a tower that is anchored to the seabed and basically afloat in an upstanding position because of the gravity center of the whole wind mill located downward from the center of buoyancy of the wind mill".

According to the wind-driven electric power plant of Japanese Unexamined Patent Application Publication No. 2005-526213, the large floating-type power generating wind mill installed offshore can achieve sufficient stability for absorbing wind power acting on the windmill rotor.

SUMMARY OF INVENTION

In the development of the floating offshore wind power generation system, as described above, various approaches have been taken to reduce installation costs of equipment for offshore construction work and the like and to ensure that the wind mill on the instable ocean can efficiently generate electric power by receiving sufficient wind.

The floating offshore wind power generation system as disclosed in Japanese Unexamined Patent Application Publication No. 2005-526213, for example, has the following problem. Since the floating offshore wind power generation system is anchored to the seabed with a single mooring member, the system can achieve more reduction of the offshore construction work costs than the conventional floating offshore wind power generation system anchored with the three or more mooring members substantially of the same tension. However, when the direction of ocean current or the wind direction changes, it is difficult for the windmill to catch the wind fully so that power generation efficiency may fall.

There is also a fear that the whole body of the floating offshore wind power generation system may become submerged when the ocean current speed increases beyond the scope of assumption because a bottom of the floating body is anchored to the seabed with a single mooring member.

It is therefore an object of the present invention to provide a floating offshore wind power generation system that is adapted for efficient electric power generation as well as the reduction of equipment installation cost.

According to the present invention for achieving the above object, a wind power generation system comprising: a wind power generation equipment having a rotor which is operative to convert energy of received wind to rotational energy, a rotatable nacelle which supports the rotor, a tower which supports the rotatable nacelle, a floating body which supports the tower and at least a part of itself is positioned above the surface of the sea, a fixing member which is installed or fixed on the sea bed, a mooring member which couples the floating body and the fixing member, wherein the mooring member is coupled to the floating body at place upward of the center of gravity of the floating body and the wind power generation equipment, and the floating body is practically supported by one fixing member.

The present invention can provide a floating offshore wind power generation system that is adapted for the stable, efficient electric power generation as well as the reduction of equipment installation costs.

Problems, structures, and effects other than those described above will be apparent with explanations of the following embodiments.

DESCRIPTION OF EMBODIMENTS

Figure 1:
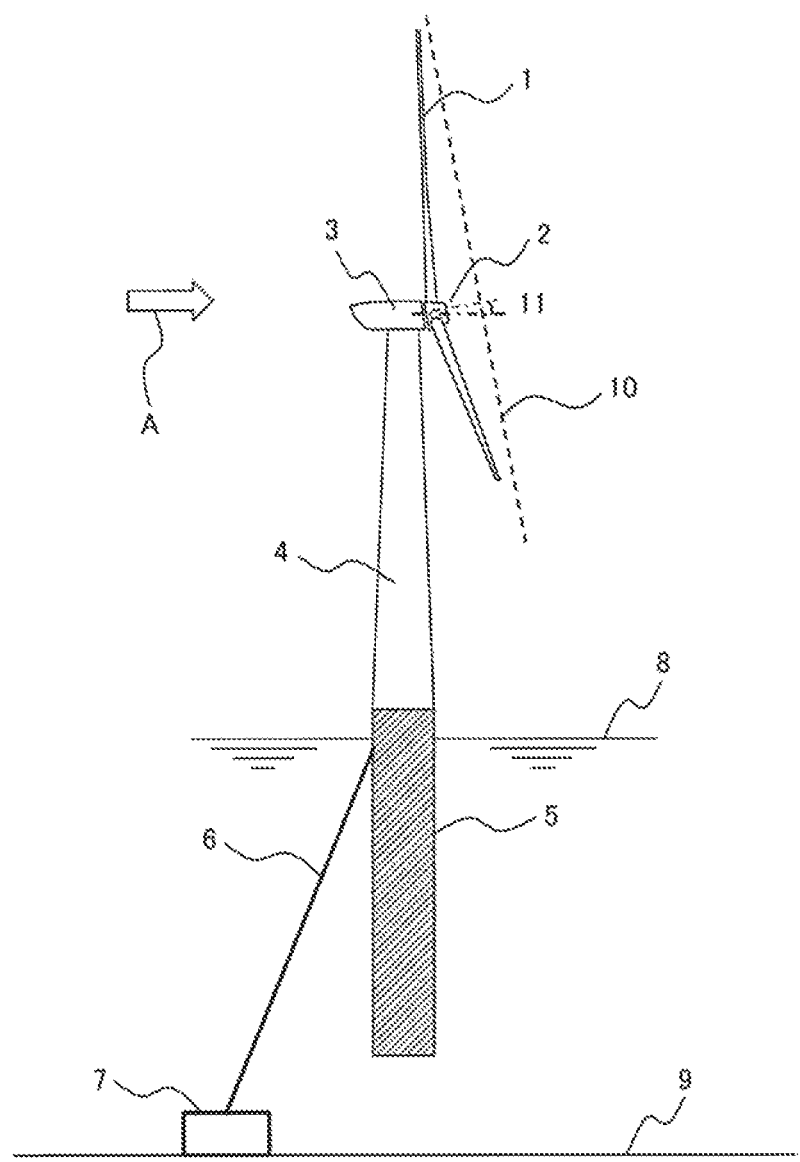
FIG. 1 is a general schematic diagram showing a wind power generation system according to one embodiment of the present invention.

The embodiments of the present invention will hereinbelow be described with reference to the accompanying drawings. In the drawings, like reference characters refer to the corresponding components and the detailed description thereof is dispensed with.

First Embodiment

Figure 11:
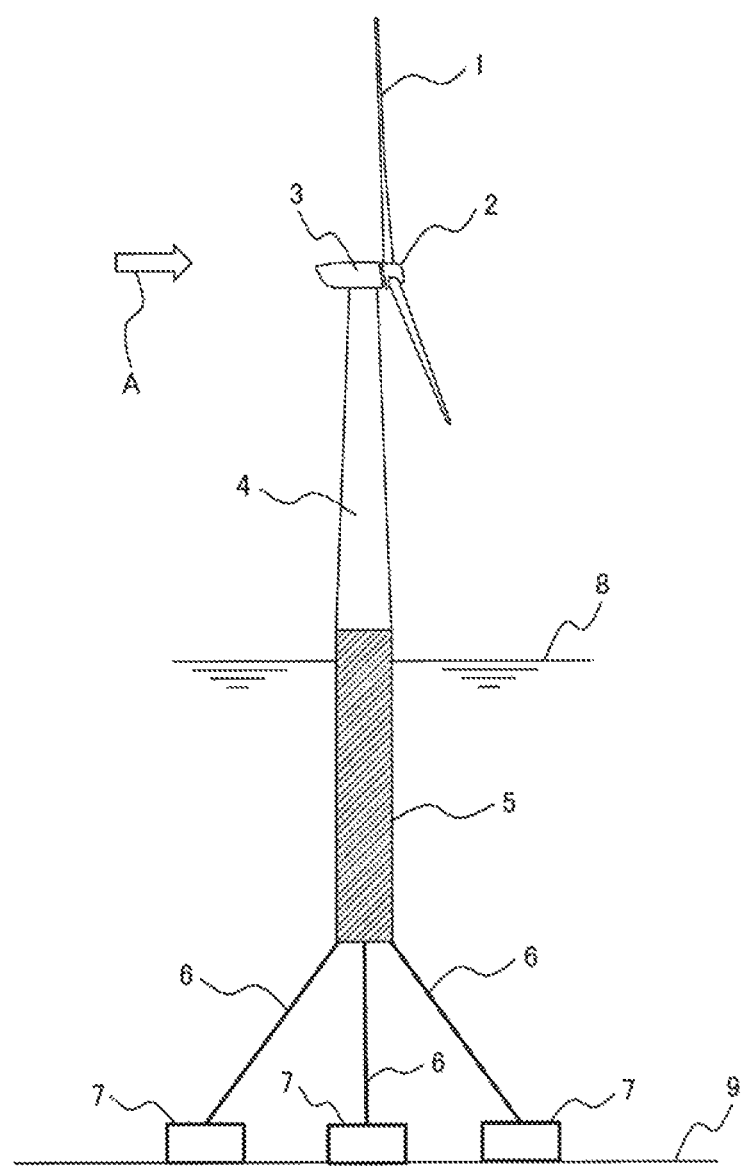
FIG. 11 is a general schematic diagram showing a conventional wind power generation system.

First, a conventional wind power generation system is described with reference to FIG. 11. FIG. 11 is a general schematic diagram showing a downwind type floating offshore wind power generation system.

As shown in FIG. 11, the conventional floating offshore wind power generating system includes a floating body 5 floating on the ocean, and a tower 4 mounted on the floating body 5 and serving as a support pillar of the wind power generation system. A rotatable nacelle 3 incorporating an unillustrated electric generator is mounted on the tower 4.

A rotor which includes a hub 2 and a plurality of blades 1 is mounted to one end of the nacelle 3. The wind power generation system is constructed such that this rotor receives wind A and converts the received energy to rotational energy which is transmitted to the electric generator for electric power generation.

The floating body 5 is liable to be instable under the influence of waves occurring on the sea surface 8 and the ocean current. When the floating body 5 becomes instable offshore, the wind power generation system mounted thereon, namely the windmill, is also in an instable condition so as to be incapable of efficiently receiving the wind A on the rotor. This results in decreased power generation efficiency. In order to set the floating body 5 in the stable condition as much as possible, a lower end of the floating body 5 is coupled to a fixing member 7 secured to a seabed 9 by means of a mooring member 6 made of a rigid rope, chain or the like.

It is noted here that the conventional floating offshore wind power generation system has three or more mooring members 6 respectively coupled to the plural fixing members 7 separately secured to the seabed 9, as shown in FIG. 11. The three or more mooring members 6 respectively interconnecting the floating member 5 and the fixing members 7 are set up substantially with an equal tension. The stability of the floating body 5 and the wind power generation system mounted thereon is ensured by setting up the three or more mooring members 6 with substantially the same tension.

As described above, the offshore construction work for setting up the three mooring members with substantially the same tension requires adjustment so that the cost of the construction work is very high.

Figure 2:
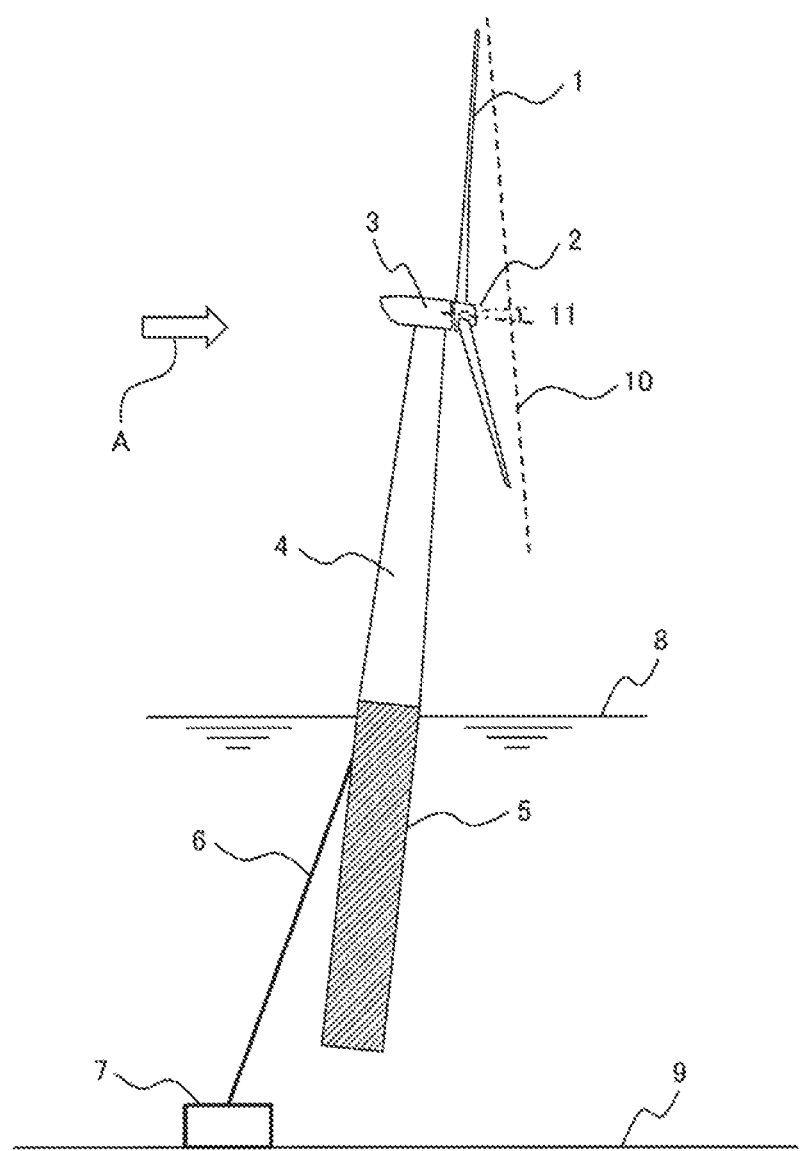
FIG. 2 is a general schematic diagram showing a wind power generation system according to one embodiment of the present invention.

Next, a floating offshore wind power generation system according to a first embodiment is described with reference to FIGS. 1 and 2. FIGS. 1 and 2 are general schematic diagrams showing a downwind type floating offshore wind power generation system according to this embodiment. FIG. 1 shows a condition of the floating offshore wind power generation system when the system is on the dead calm sea or in breeze. FIG. 2 shows a condition of the floating offshore power generation system when the system is under a comparatively strong wind.

The floating offshore wind power generation system shown in FIG. 1 and FIG. 2 has the same structure as the floating offshore wind power generation system of FIG. 11 in that the tower 4 serving as the support pillar of the wind power generation system is mounted on the floating body 5 floating offshore. Further, this wind power generation system is also constructed the same way as the floating offshore wind power generation system of FIG. 11 in that the rotatable nacelle 3 incorporating the unillustrated electric generator is mounted on the tower 4 and that the rotor including the hub 2 and the plural blades 1 is mounted to one end of the nacelle 3.

As shown in FIG. 1, the floating offshore wind power generation system according to this embodiment has the floating body 5 coupled to the fixing member 7 secured to the seabed 9 by means of a single mooring member 6 and thus is anchored to the seabed. It is noted here that the floating body 5 is coupled with the mooring member 6 at place upward of the center of gravity of the whole body of the floating offshore wind power generation system that includes the floating body 5, and the wind power generation system mounted thereon, which includes the tower 4, the nacelle 3, the electric generator incorporated in the nacelle 3, and the rotor including the hub 2 and the plural blades 1 which are disposed on the leeward side of the nacelle 3.

The rotor including the hub 2 and the plural blades 1 is mounted as tilted upward in a manner that a plane interconnecting tips of the plural blades 1, namely a rotor plane 10 has a tilt angle 11.

The above-described structure permits the floating offshore wind power generation system to be stably installed offshore even though the floating body 5 is anchored to the seabed 9 with a single mooring member 6.

Further, the power generation efficiency can be increased by assembling the rotor tilted upward to form the tilt angle 11. As shown in FIG. 2, the rotor can receive the maximum amount of wind when, under the comparatively strong wind or the strong wind, the whole body of the floating offshore wind power generation system including the floating body 5 and the tower 4 is inclined toward the leeward side.

Second Embodiment

Figure 3:
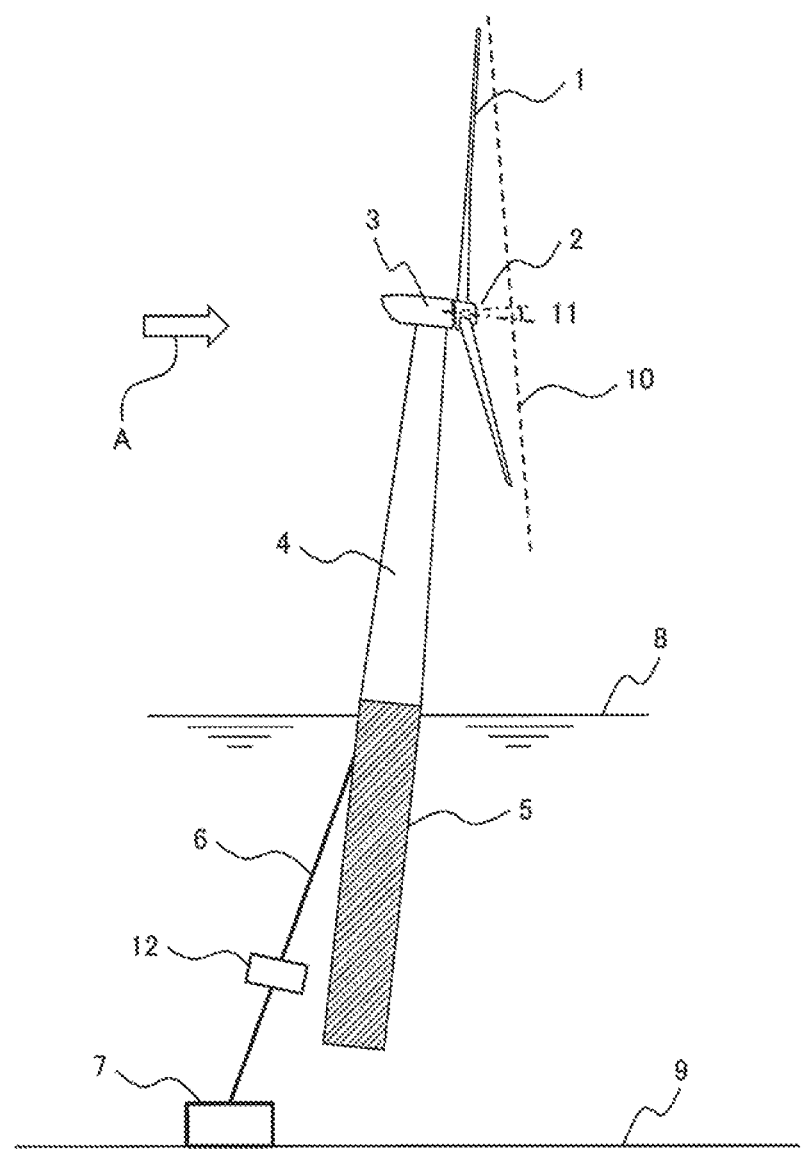
FIG. 3 is a general schematic diagram showing a wind power generation system according to one embodiment of the present invention.
Figure 9A:
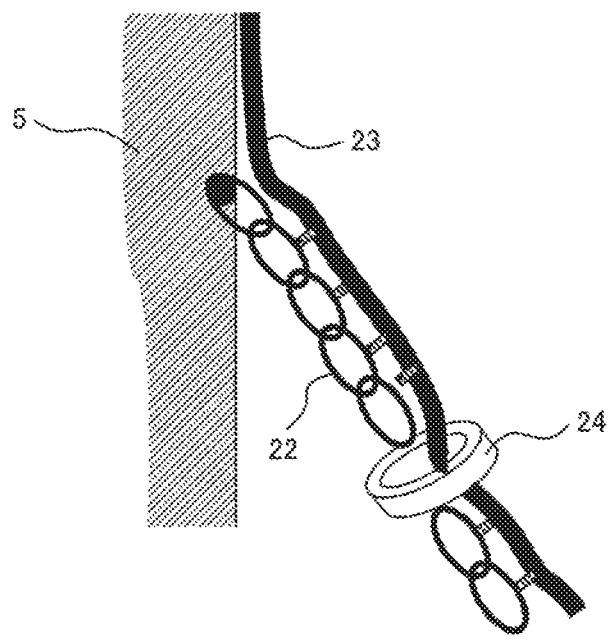
FIG. 9A is a diagram showing a torsion preventive coupling member of a wind power generation system according to one embodiment of the present invention.

A floating offshore wind power generation system according to a second embodiment is described with reference to FIGS. 3 and 9A. FIG. 3 is a general schematic diagram showing a downwind type floating offshore wind power generation system according to this embodiment. FIG. 9A shows an example of a torsion preventive coupling member 12 shown in FIG. 3.

As described in the foregoing, the conventional floating offshore wind power generation system has the structure less affected by the direction of the ocean current or the wind direction because the structure is stably anchored to the seabed by means of three or more mooring members with substantially the same tension. However, the floating offshore wind power generation system illustrated by the first embodiment has the floating body 5 anchored to the seabed 9 by means of a single mooring member 6 and hence, may encounter a problem. In a case, for example, where an intensive whirlpool occurs undersea or where the wind direction changes frequently, the whole body of the floating offshore wind power generation system turns about a connection between the mooring member 6 and the fixing member 7 as a fulcrum.

In this case, the mooring member 6 may be entangled with arm unillustrated undersea cable, making the floating offshore wind power generation system unable to keep its balance well on the ocean. In consequence, the rotor fails to catch the wind A efficiently, resulting in the decreased power generation efficiency. There is also a fear that the floating offshore wind power generation system may drift away if the mooring member 6 or the unillustrated undersea cable is broken.

In the floating offshore wind power generation system according to this embodiment, as shown in FIG. 3, the single mooring member 6 is provided with at least one torsion preventive coupling member 12 so as to release torsion of the mooring member 6 in case that the mooring member 6 sustains torsion.

This ensures that the torsion in the mooring member induced by the change in the ocean current direction or wind direction is suppressed even though the floating offshore wind power generation system is anchored to the seabed with the single mooring member.

As shown in FIG. 9A, an arrangement may be made such that the mooring member employs a mooring member 22 made of chain and coupled with a cable 23 for transmitting the generated electric power, and is provided with a torsion preventive coupling member 24 for releasing the torsion of the mooring member 22 and cable 23.

Third Embodiment

Figure 4A:
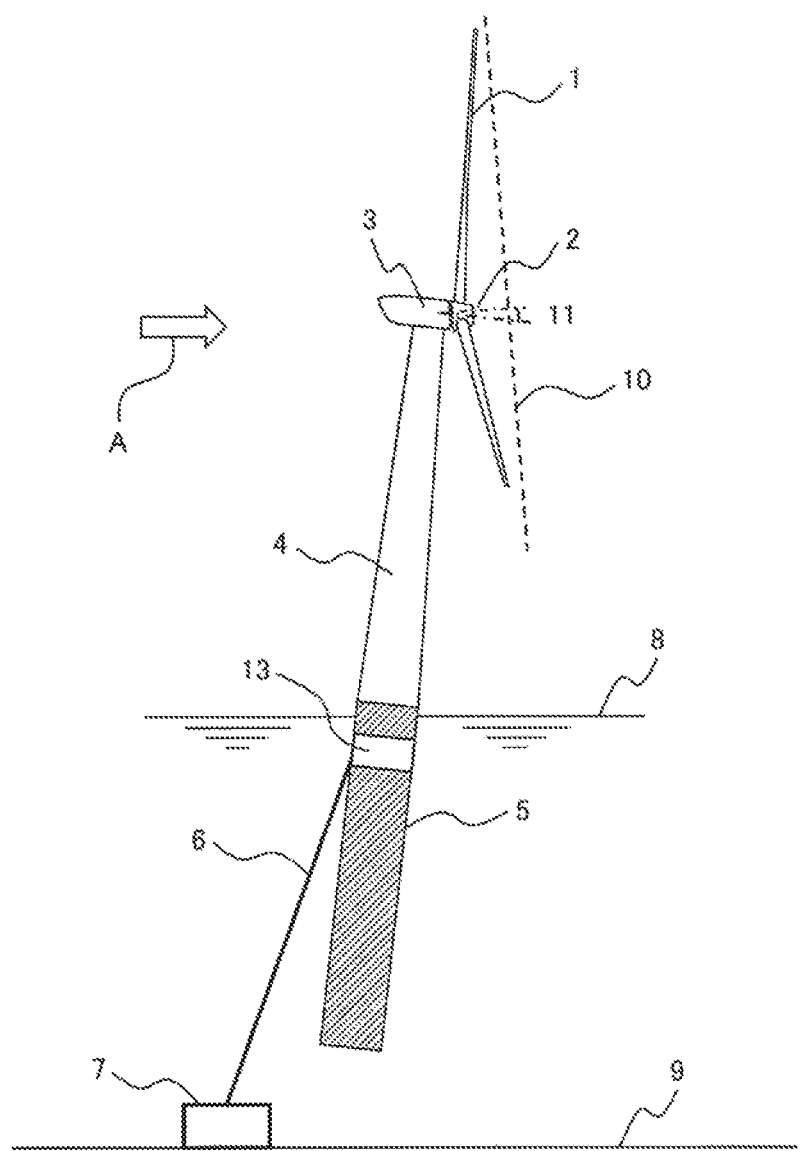
FIG. 4A is a general schematic diagram showing a wind power generation system according to one embodiment of the present invention.
Figure 4B:
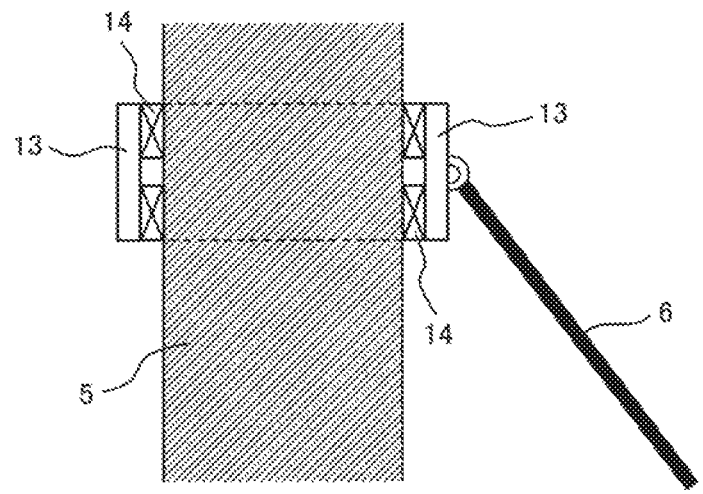
FIG. 4B is a diagram showing a rotary fastening member of the wind power generation system according to one embodiment of the present invention.
Figure 4C:
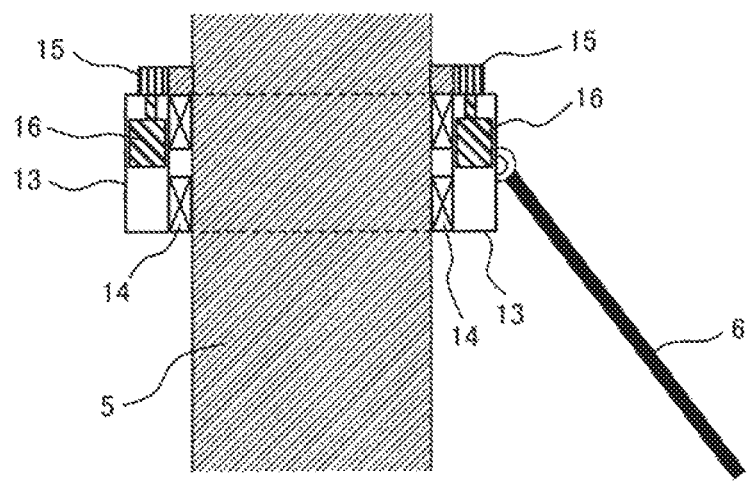
FIG. 4C is a diagram showing a rotary fastening member of the wind power generation system according to one embodiment of the present invention.

Now referring to FIGS. 4A to 4C, description is made on a floating offshore wind power generation system according to a third embodiment. FIG. 4A is a general schematic diagram showing a downwind type floating offshore wind power generation system according to this embodiment. FIGS. 4B and 4C each show an example of a rotary fastening member 13 shown in FIG. 4A.

The second embodiment illustrates the example where the mooring member 6 is provided with at least one torsion preventive coupling member 12 for releasing the torsion in order to suppress the torsion of the mooring member induced by the change in the ocean current direction or the wind direction. This embodiment has a structure where the floating body 5 is provided with a rotary fastening member 13 which permits the rotation of the floating body 5, or a structure adapted to suppress the torsion of the mooring member which is induced by the change in the ocean current direction or the wind direction.

The mooring member 6 is coupled to the floating body 5 by means of the rotary fastening member 13. This rotary fastening member 13 is mounted to the floating body 5 in a manner to be rotatable in a circumferential direction of the floating body 5.

As shown in FIG. 4B, the rotary fastening member 13 coupled with the mooring member 6 is mounted to the floating body 5 via a bearing 14. Because of the bearing 14 disposed between the rotary fastening member 13 and the floating body 5, the rotary fastening member 13 is free to rotate in the circumferential direction of the floating body 5.

Even in the case where the floating offshore wind power generation system is anchored to the seabed with the single mooring member, as shown in FIG. 4B, the torsion of the mooring member induced by the change in the ocean current direction or wind direction can be suppressed by coupling the mooring member 6 to the floating body 5 by means of the rotary fastening member 13.

Further as shown in FIG. 4C, a pinion gear 15 and a drive motor 16 may be mounted to the rotary fastening member 13 such as to electrically drive the rotary fastening member 13 to rotate on the floating body 5. In this case, it is also possible, for example, to detect the change in the ocean current direction or wind direction by a sensor and to control the position of the rotary fastening member 13 on the floating body 5 based on the detection value.

As shown in FIG. 4C, the direction of the floating body 5 can be changed in accordance with the ocean current direction or wind direction by electrically controlling the rotation of the rotary fastening member 13. This also affords an effect to reduce yaw control load of the floating offshore wind power generation system mounted on the floating body 5.

Fourth Embodiment

Figure 5A:
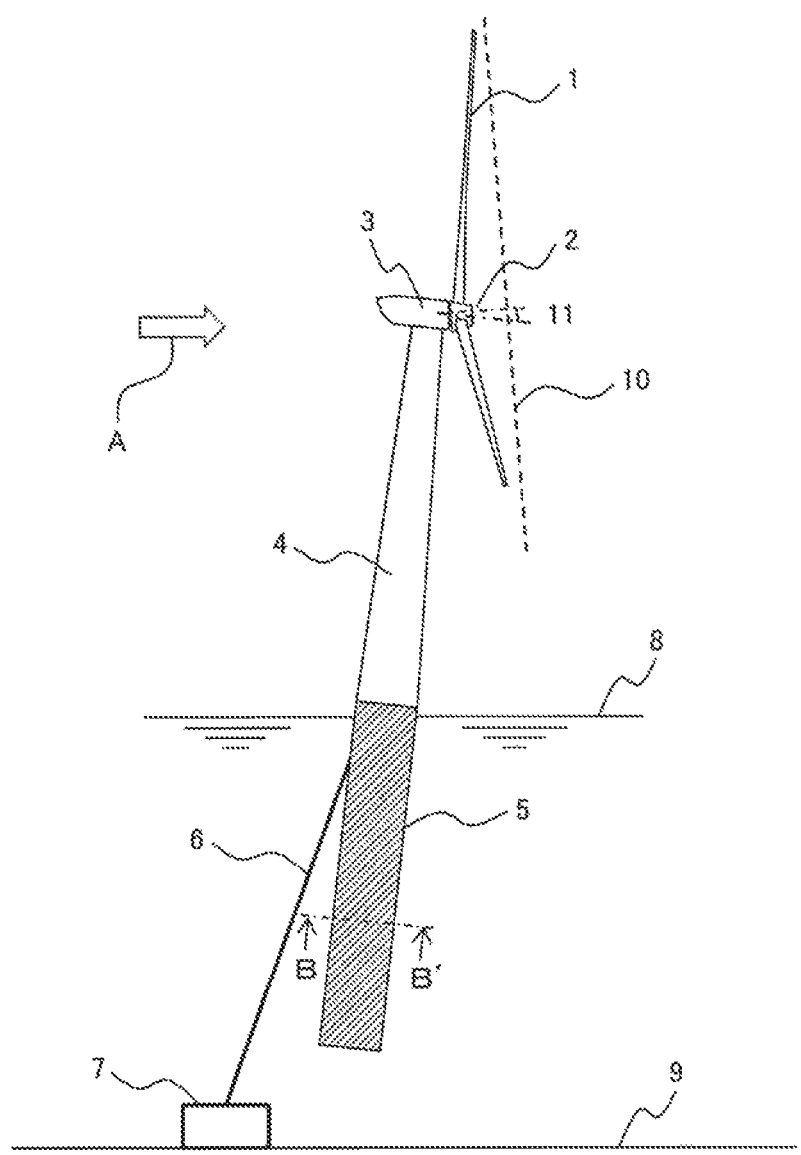
FIG. 5A is a general schematic diagram showing a wind power generation system according to one embodiment of the present invention.
Figure 5B:
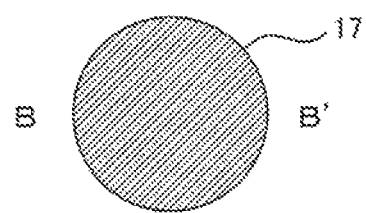
FIG. 5B is a fragmentary sectional view of a tower of a wind power generation system according to one embodiment of the present invention.
Figure 5C:
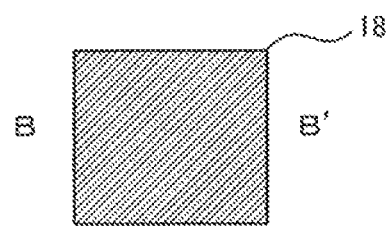
FIG. 5C is a fragmentary sectional view of a tower of a wind power generation system according to one embodiment of the present invention.
Figure 5D:
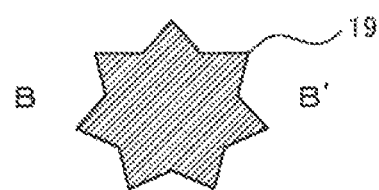
FIG. 5D is a fragmentary sectional view of a tower of a wind power generation system according to one embodiment of the present invention.

A floating offshore wind power generation system according to a fourth embodiment is described with reference to FIGS. 5A to 5D. FIG. 5A is a general schematic diagram showing a downwind type floating offshore wind power generation system according to this embodiment. FIGS. 5B to 5D each show a sectional view of the floating body 5 taken on the line B-B' in FIG. 5A.

As shown in FIG. 5B, the floating offshore wind power generation system according to this embodiment employs a spar type floating body 5 having a substantially cylindrical configuration such that a cross section of the floating body 5 is substantially shaped like a circle. Thus, the resistance of the ocean current against the floating body 5 can be minimized so that the torsion of the mooring member induced by the change in the ocean current direction can be suppressed.

Further, as shown in FIGS. 5C and 5D, the floating body 5 may be configured to have a substantially rectangular cross sectional shape or a substantially star-like cross sectional shape so as to be adapted to receive the resistance of the ocean current. Thus, the floating offshore wind power generation system can obtain an effect to attenuate vibrations occurring in the floating body and the wind power generation system.

It is noted that the floating body 5 may be configured such that the whole body of the floating body 5 has any one of the cross sectional shapes shown in FIGS. 5B to 5D or that the floating body 5 partly has any one of the cross sectional shapes shown in FIGS. 5B to 5D.

Fifth Embodiment

A floating offshore wind power generation system according to a fifth embodiment is described with reference to FIG.

Figure 6:
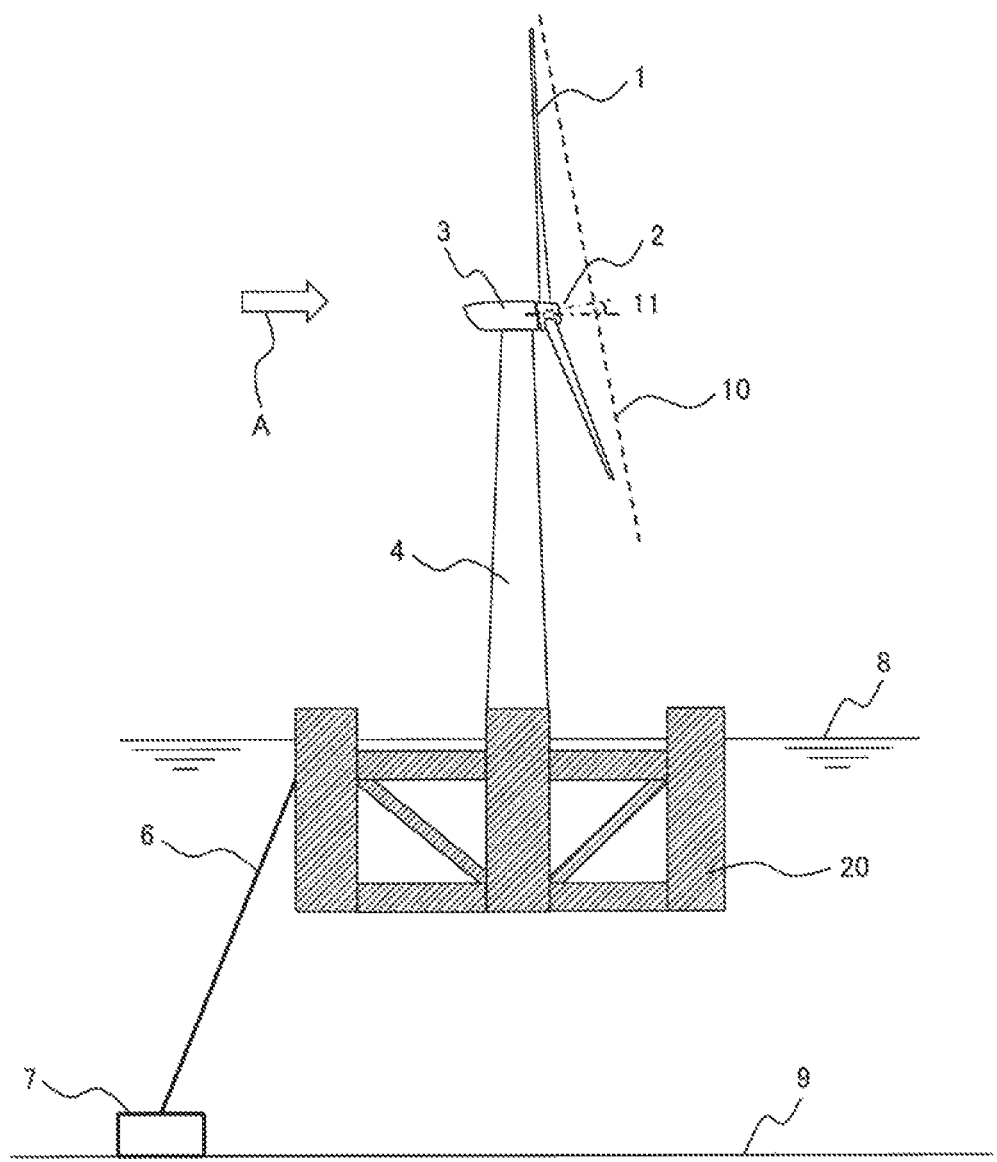
FIG. 6 is a general schematic diagram showing a wind power generation system according to one embodiment of the present invention.

6. FIG. 6 is a general schematic diagram showing a downwind type floating offshore wind power generation system according to this embodiment.

As shown in FIG. 6, a floating body of the floating offshore wind power generation system according to this embodiment is a semisubmersible floating body 20 composed of an assembly of plural substantially cylindrical structures. This semisubmersible floating body 20 is coupled with the mooring member 6. The semisubmersible floating body 20 has a complicated configuration susceptible to the resistance of the ocean current and hence, can stably float in the sea. Thus the floating offshore wind power generation system is obtained which is less prone to rolling even when anchored to the seabed with a single mooring member 6.

Sixth Embodiment

Figure 7:
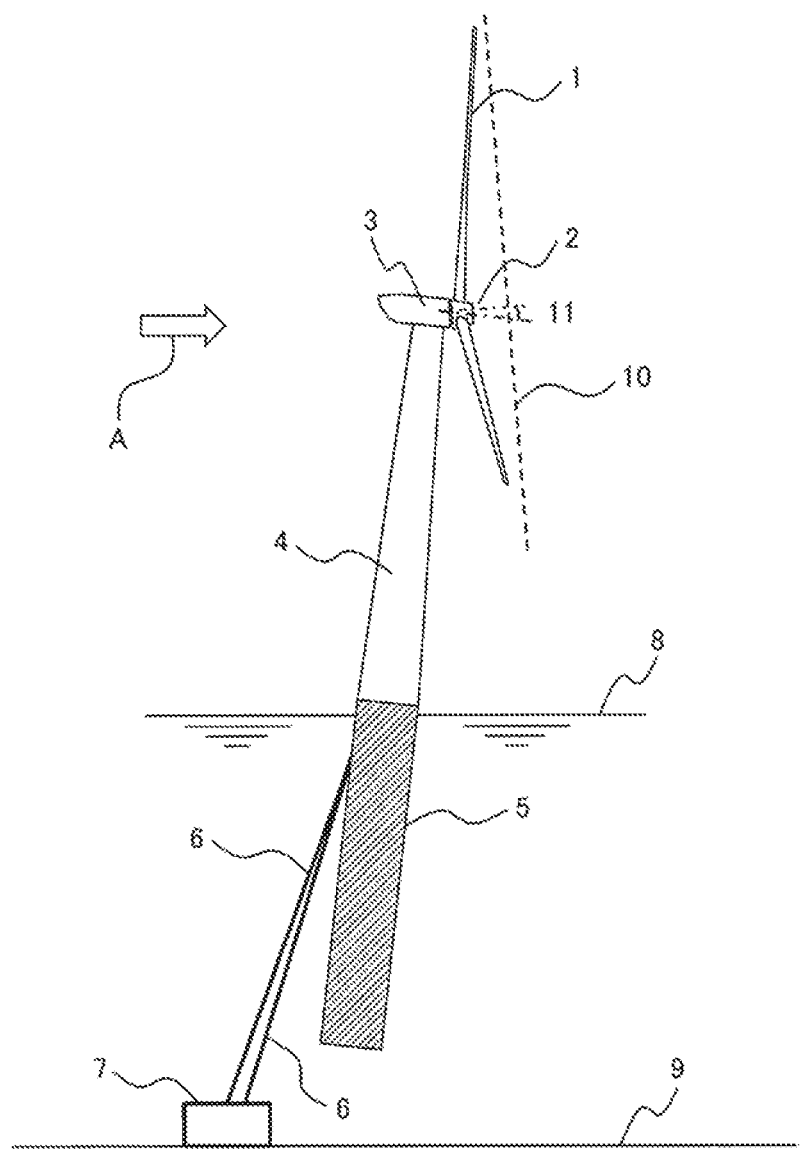
FIG. 7 is a general schematic diagram showing a wind power generation system according to one embodiment of the present invention.

A floating offshore wind power generation system according to a sixth embodiment is described with reference to FIG. 7. FIG. 7 is a general schematic diagram showing a downwind type floating offshore wind power generation system according to this embodiment.

While the floating offshore wind power generation system illustrated by the first embodiment is anchored to the seabed by means of a single mooring member 6 coupling together the floating body 5 and the fixing member 7 secured to the seabed 9, the system of this embodiment is anchored by means of two mooring members 6 coupling together the floating body 5 and the fixing member 7 secured to the seabed 9.

As described in connection with the first embodiment, the conventional floating offshore wind power generation system shown in FIG. 11 requires high costs for the offshore construction work thereof because the system has three or more mooring members coupled to the separate fixing members 7 secured to the seabed substantially with the same tension. On the other hand, the floating offshore wind power generation system of this embodiment has at least two mooring members 6 coupled to the same fixing member 7.

It is noted here that the at least two mooring members 6 may be coupled to the fixing member 7 substantially with the same tension or may individually be coupled to the fixing member 7 with different tensions. In a case where the two mooring members 6 are individually coupled to the fixing member 7 with different tensions, the cost for this offshore construction work can be reduced as compared with the case where the mooring members are coupled to the fixing member substantially with the same tension.

According to the floating offshore wind power generation system of this embodiment, the floating offshore wind power generation system can be prevented from drifting away because even when one of the mooring members 6 is broken, the other mooring member 6 can moor the floating body 5.

Seventh Embodiment

Figure 8:
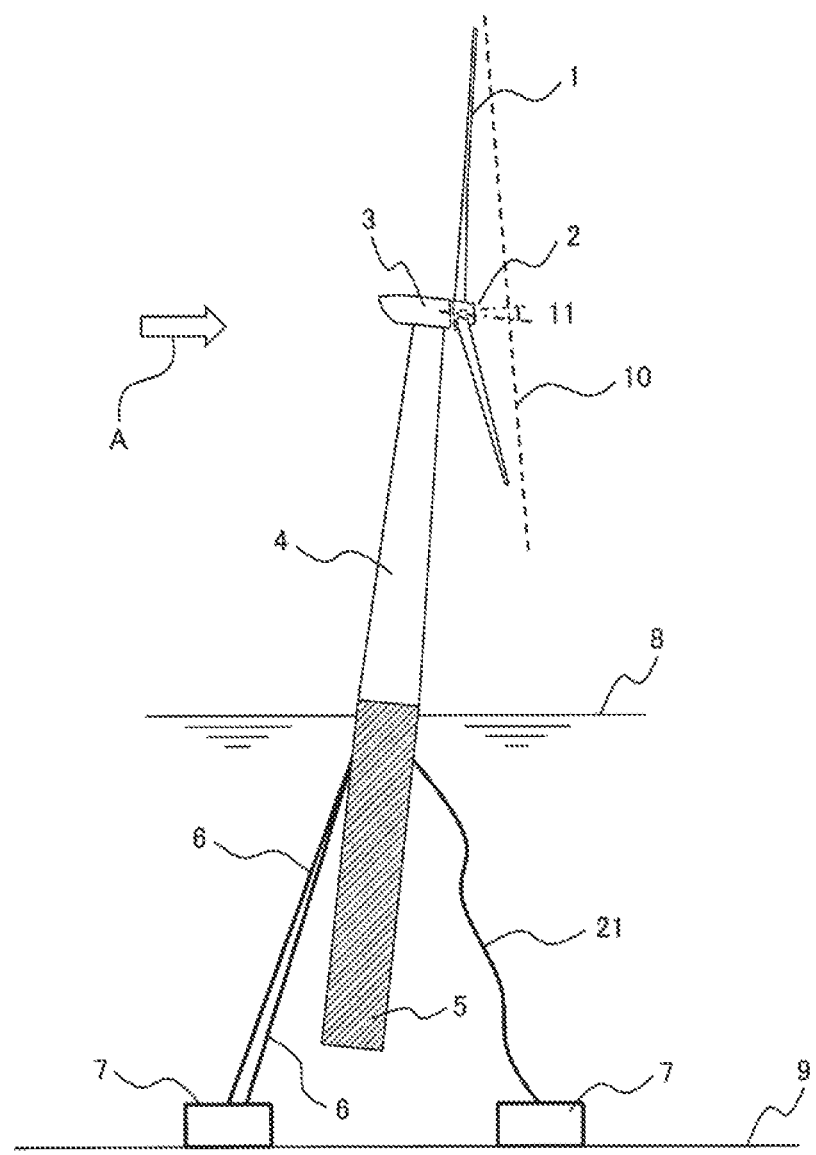
FIG. 8 is a general schematic diagram showing a wind power generation system according to one embodiment of the present invention.

A floating offshore wind power generation system according to a seventh embodiment is described with reference to FIG. 8. FIG. 8 is a general schematic diagram showing a downwind type floating offshore wind power generation system according to one embodiment.

The floating offshore wind power generation system of the sixth embodiment illustrates the example where the floating body 1 and one fixing member 7 are coupled together by means of at least two mooring members 6. According to this embodiment, an additional fixing member 7 is secured to the seabed 9 and the floating body 5 and the additional fixing member 7 are coupled together by means of another mooring member 21 with a different tension.

Such an arrangement has an effect that when the ocean current direction or the wind direction changes, the floating offshore wind power generation system is changed in position so that the tension of the mooring member 21 set up with the lower tension is increased so much as to exceed that of the other two mooring members 6 and hence, the floating body 5 is moored by the mooring member 21.

Even in the case where both the mooring members 6 are broken, the mooring member 21 can prevent the floating offshore wind power generation system from drifting away, just as in the sixth embodiment. Furthermore, the floating body 5 can be moored by the mooring member 21.

It is noted that the floating body 5 coupled to the plural mooring members may also be anchored to the seabed 9 practically with one of the plural mooring members, as shown in FIG. 8.

It is also noted that the phrase "substantially one fixing member" obviously refers to a case where there is only one fixing member. In a case where there are plural fixing members, however, the above phrase means that it may be supported basically by one fixing member. In this case, there may be a transient state in which the force for momentarily supporting the floating body between a plurality of the fixed members is equally, however, basically it is possible to support the floating body 5 by about one fixing member. Note that it is practically supported by one fixing member includes a transient state as described above.

In addition, the floating body 5 which is coupled to a plurality of mooring members may be fixed to the seabed 9 by practically one of the plurality of mooring members.

It is noted that the phrase "substantially one mooring member" obviously refers to a case where there is only one mooring member. In a case where there are plural mooring members, however, the above phrase does not mean that all the mooring members are kept in tension but means that what is required is to keep at least one of the plural mooring members in tension. The mooring member placed in tension can change depending upon the position of the floating body. The concept for transient conditions is the same as those on "one fixing member" as described above.

Eighth Embodiment

Figure 9B:
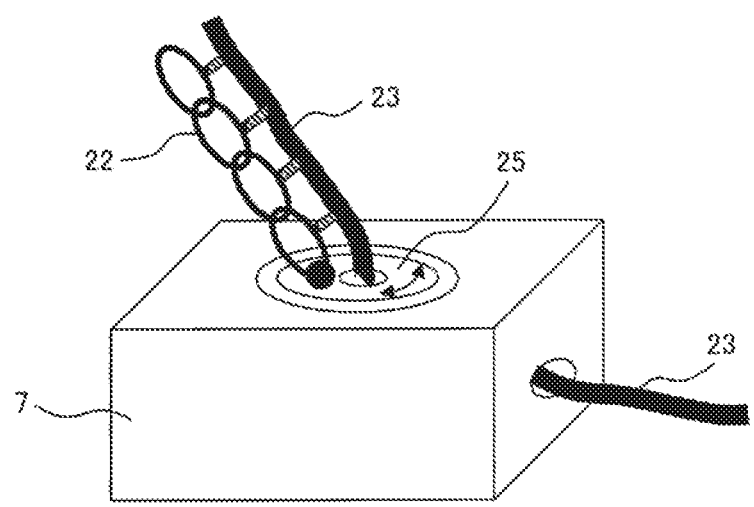
FIG. 9B is a diagram showing a torsion preventive coupling member of a wind power generation system according to one embodiment of the present invention.

FIG. 9B shows an example of the fixing member 7 secured to the seabed 9. The filing member 7 is provided with a rotary fastening member 25 at an upper part thereof. The rotary fastening member 25 is formed with an aperture (hole) through which the cable 23 passes. Further, the rotary fastening member 25 is coupled with a mooring member 22 formed of chain. The rotary fastening member 25 assembled to the fixing member 7 is free to rotate on the fixing member 7. The mooring member 22 formed of chain and the cable 23 are fixedly coupled with each other.

The torsion of the mooring member can be suppressed by applying the fixing member 7 provided with the preventive measure against the torsion of mooring member, as illustrated by this embodiment, to the floating offshore wind power generation systems illustrated by the first to the seventh embodiments.

Ninth Embodiment

Figure 10A:
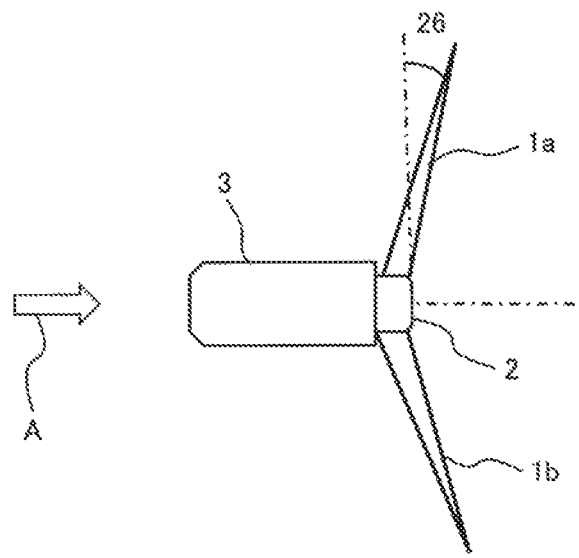
FIG. 10A is a diagram showing a cone angle of a downwind type windmill.
Figure 10B:
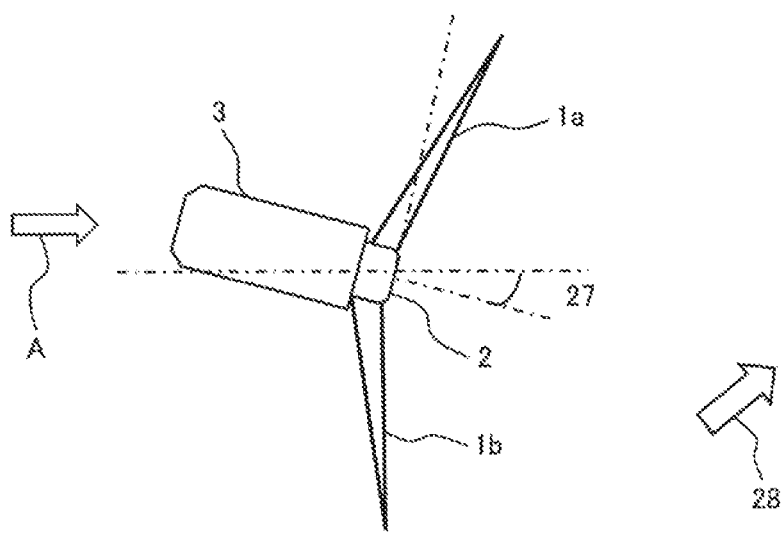
FIG. 10B is a diagram showing a restorative force against a yaw deviation angle of the downwind type windmill.

A floating offshore wind power generation system according to this embodiment is described with reference to FIGS. 10A and 10B. FIGS. 10A and 10B each show the nacelle 3 and the rotor, as seen from above, of the floating offshore wind power generation system illustrated by the first embodiment to the seventh embodiment.

As shown in FIG. 10A, the rotor shape of the floating offshore wind power generation system illustrated by the respective embodiments may have a configuration where a plurality of blades 1a, 1b are assembled at a given angle (cone angle 26) to the hub 2 so as to allow the nacelle to be constantly directed in the wind direction with respect to yaw rotation about an axis of the tower. This cone angle 26 is an angle formed between a plane perpendicular to an unillustrated main shaft of the rotor and the blade 1a (1b).

By imparting this cone angle to the rotor of the floating offshore wind generation system illustrated by the first embodiment to the seventh embodiment, the nacelle can be directed in the wind direction with respect to the yaw rotation or the rotation of the windmill with respect to the tower axis.

In a case where the nacelle 3 and the rotor of the floating offshore wind power generation system illustrated by the respective embodiments rotate, in a substantially horizontal plane, as angled at a given angle (yaw deviation angle 27) as shown in FIG. 10B, the blade 1b receives a greater thrust force than the blade 1a inclined at the larger angle to the wind A so that a yaw restorative force 28 is induced in the windmill, directing the nacelle in the wind direction. Thus, the floating offshore wind power generation system can maintain efficient electric power generation.

As described above, the floating offshore wind power generation systems of the first embodiment to the ninth embodiment can provide a floating offshore wind power generation system that is adapted for the stable, efficient electric power generation as well as the reduction of offshore construction work costs for equipment installation.

While each of the foregoing embodiments has been described mainly taking the downwind type floating offshore wind power generation system as an example, similar effects can also be obtained by an upwind type floating offshore wind power generation system.

The floating offshore wind power generation system can be continuously operated even during power failure by adopting a structure which can supply the electric power to a yaw control mechanism from an auxiliary power supply such as an uninterruptible power supply mounted to the floating offshore wind power generation system. This auxiliary power supply can employ an electric storage device, a diesel power generator, an engine generator, a tidal power generator and the like, aside from the uninterruptible power supply.

The present invention is not limited to the foregoing embodiments but includes various modifications thereof. For example, the foregoing embodiments have been described in detail for the purposes of clarity of the present invention. The present invention is not necessarily limited to embodiments that include all the components described. Further, a part of the structure of one embodiment is replaceable with a structure of another embodiment. It is also possible to add a structure of one embodiment to a structure of another embodiment. Further, a part of the structure of each of the embodiments permits addition of or replacement with another structure or deletion thereof.

REFERENCE SIGNS LIST

A . . . WIND
1, 1a, 1b . . . BLADE
2 . . . HUB
3 . . . NACELLE
4 . . . TOWER
5 . . . FLOATING BODY
6, 21, 22 . . . MOORING MEMBER
7 . . . FIXING MEMBER
8 . . . SEA SURFACE
9 . . . SEABED
10 . . . ROTOR PLANE
11 . . . TILT ANGLE
12, 24 . . . TORSION PREVENTIVE COUPLING MEMBER
25 . . . ROTARY FASTENING MEMBER
14 . . . BEARING
15 . . . PINION GEAR
16 . . . DRIVE MOTOR
17 . . . CIRCULAR CROSS SECTION
18 . . . RECTANGULAR CROSS SECTION
19 . . . STAR-LIKE CROSS SECTION
20 . . . SEMISUBMERSIBLE FLOATING BODY
23 . . . CABLE
26 . . . CONE ANGLE
27 . . . YAW DEVIATION ANGLE
28 . . . YAW RESTORATIVE FORCE

What is claimed is:

1. A wind power generation system comprising:
a wind power generation equipment having a rotor which is operative to convert energy of received wind to rotational energy, a rotatable nacelle which supports the rotor, a tower which supports the rotatable nacelle and the rotatable nacelle rotates in a substantially horizontal plane,
a floating body which supports the tower and at least a part of the floating body is positioned above a sea surface,
a fixing member which is installed or fixed on a sea bed, and
a first mooring member which couples the floating body and the fixing member,
wherein the first mooring member is coupled to the floating body at a position above a center of gravity of the floating body, the position of the coupling between the first mooring member and the floating body being submerged in water below the sea surface, and the floating body is supported by one fixing member,
wherein the wind power generation system is of a downwind type where the rotor is disposed on the leeward side of the nacelle, and
wherein the rotor has the plural blades disposed aslant upward with respect to the horizontal plane.

2. The wind power generation system according to claim 1, further comprising a second mooring member, wherein the second mooring member has a tension different from a tension of the first mooring member.

3. The wind power generation system according to claim 1, wherein the rotor has the plural blades disposed aslant to the leeward side with respect to a rotor plane.

4. The wind power generation system according to claim 1, wherein the first mooring member is provided with at least one torsion preventive coupling member for releasing the torsion of the first mooring member.

5. The wind power generation system according to claim 1, wherein the first mooring member is coupled to the floating body by means of a rotary fastening member which is mounted to the floating body and permits the rotation of the floating body.

6. The wind power generation system according to claim 5, wherein the rotary fastening member is driven by a motor so that a position of the rotary fastening member relative to the floating body can be controlled.

7. The wind power generation system according to claim 1, wherein the first mooring member is coupled to the fixing member by means of a rotary fastening member which is mounted to the fixing member.

8. The wind power generation system according to claim 1, wherein the floating body is of a spar type having a substantially cylindrical shape.

9. The wind power generation system according to claim 1, wherein the floating body is of a semisubmersible type including an assembly of plural substantially cylindrical structures.

10. The wind power generation system according to claim 1, wherein the floating body has a cross section, at least a part of which is substantially a rectangular shape or substantially a star-like shape.

* * * * *